United States Patent
Benedikt et al.

(10) Patent No.: US 11,565,581 B2
(45) Date of Patent: *Jan. 31, 2023

(54) SEQUENTIAL SIMULATED GEAR RATIO CALCULATION AND REV-MATCHING IN A HYBRID ELECTRIC VEHICLE

(71) Applicant: TOYOTA MOTOR ENGINEERING & MANUFACTURING NORTH AMERICA, INC., Plano, TX (US)

(72) Inventors: Erik Hasso Benedikt, Ann Arbor, MI (US); Shannon Wrobel, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 365 days.

This patent is subject to a terminal disclaimer.

(21) Appl. No.: 16/736,794

(22) Filed: Jan. 7, 2020

(65) Prior Publication Data

US 2021/0206254 A1    Jul. 8, 2021

(51) Int. Cl.
*B60K 6/36*        (2007.10)
*B60K 6/48*        (2007.10)
(Continued)

(52) U.S. Cl.
CPC ............. *B60K 6/36* (2013.01); *B60K 6/48* (2013.01); *B60W 40/09* (2013.01);
(Continued)

(58) Field of Classification Search
CPC .... B60K 6/36; B60K 6/48; B60K 2006/4841; B60K 6/445; B60W 40/09;
(Continued)

(56) References Cited

U.S. PATENT DOCUMENTS 7,641,586 B2    1/2010  Wild
8,010,264 B2    8/2011  Ogata
(Continued)

FOREIGN PATENT DOCUMENTS

DE    102005016117 A1    7/2006
EP        2149488 A2    2/2010
JP        2015160462       9/2015

OTHER PUBLICATIONS

Synchronized down shift rev-matching system, https://en.wikipedia.org/wiki/Synchronized_down_shift_rev-matching_system, website acessed Feb. 26, 2019, Wikipedia.

*Primary Examiner* — Rodney A Butler
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for simulating rev-matching in hybrid electric vehicles (HEVs). In particular, increased engine response is provided while downshifting during acceleration. The transmission of an HEV may include an electronic control unit that controls the speed of the engine to simulate gears, and increases the speed of the engine responsive to a driver using the gear selector to shift from one of the simulated gears to a lower one of the simulated gears, thereby providing the desired rev-matching experience. The increased engine response can be reflected in a target engine speed that is calculated based on specific gear ratios associated with each of the simulated gears.

13 Claims, 10 Drawing Sheets

(51) Int. Cl.
*G05D 1/02* (2020.01)
*B60W 40/09* (2012.01)

(52) U.S. Cl.
CPC .... *G05D 1/0223* (2013.01); *B60K 2006/4841* (2013.01); *G05D 2201/0213* (2013.01)

(58) Field of Classification Search
CPC ......... B60W 2050/0026; B60W 20/19; B60W 2540/10; B60W 2710/081; B60W 20/11; B60W 2540/16; B60W 20/15; B60W 2710/0644; B60W 30/19; G05D 1/0223; G05D 2201/0213; F16H 2061/6616; Y02T 10/62
See application file for complete search history.

(56) References Cited

U.S. PATENT DOCUMENTS

| | | |
|---|---|---|
| 8,798,838 B2 | 8/2014 | Yamanaka |
| 9,512,916 B2 | 12/2016 | Baumgartner |
| 9,567,920 B2 | 2/2017 | Ashmore |
| 9,624,846 B2 | 4/2017 | Cousins |
| 9,719,595 B2 | 8/2017 | Bur |
| 9,802,509 B2 | 10/2017 | Matsushima |
| 2014/0004994 A1 | 1/2014 | Wang |
| 2015/0012159 A1 | 1/2015 | Honda |
| 2018/0236866 A1 | 8/2018 | Paterno |
| 2018/0335135 A1 | 11/2018 | Shufro |
| 2019/0168764 A1* | 6/2019 | Hall ........................ F16H 61/16 |
| 2021/0054930 A1* | 2/2021 | Benedikt ................ B60W 20/11 |
| 2021/0206254 A1 | 7/2021 | Benedikt |

* cited by examiner

SEQUENTIAL SIMULATED GEAR RATIO CALCULATION AND REV-MATCHING IN A HYBRID ELECTRIC VEHICLE

TECHNICAL FIELD

The present disclosure relates generally to hybrid electric vehicles (HEVs), and in particular, some implementations may relate to control systems for controlling drivetrains of such HEVs.

DESCRIPTION OF RELATED ART

HEVs typically are designed and configured with conventional, automatic transmissions, automatic continuously variable transmissions (CVTs), or hybrid drive systems that use, e.g., an electric drive and planetary gearset that performs similarly to CVTs. Some HEVs are developed to attract customers familiar with manual transmissions and conventional automatic transmissions. Some HEVs are configured with a sport mode, a sequential shift mode, etc.

BRIEF SUMMARY OF THE DISCLOSURE

In accordance one embodiment, a vehicle comprises an internal combustion engine. The internal combustion engine may have a throttle, at least one motor generator operatively coupled to the internal combustion engine, and a transmission receiving drive power from at least one of the internal combustion engine and the at least one motor generator. The internal combustion engine may further have a shift selector to enable a driver of the vehicle to select a plurality of simulated gears of the transmission, and an electronic control unit. The electronic control unit may be configured to cause a rotational speed of the internal combustion engine to increase. This is in response to the driver of the vehicle using the shift selector to shift from a first one of the simulated gears to a second one of the simulated gears based upon respective simulated gear ratios associated with the first and second ones of the simulated gears. The second one of the simulated gears is lower than the first one of the simulated gears.

In accordance with some embodiments, in order to cause the throttle of the internal combustion engine to open to cause the rotational speed of the internal combustion engine to increase, the electronic control unit is further configured to transmit a target engine speed to the internal combustion engine. The target engine speed may be determined by the respective simulated gear ratios.

In some embodiments, the target engine speed comprises an engine rotations per minute (RPM) value that varies between each of the plurality of simulated gears. In some embodiments, an RPM rise rate of the internal combustion engine between successive gears of the plurality of simulated gears varies according to at least one of the respective gear ratios characteristics, accelerator pedal actuation, and vehicle speed. In some embodiments, the target engine speed is adjusted based on at least one of vehicle speed trajectory and expected vehicle speed upon completion of the shift from the first one of the simulated gears to the second one of the simulated gears.

In some embodiments, the target engine speed is further adjusted based on safety considerations pursuant to accelerator pedal actuation.

In some embodiments, the electronic control unit is further configured to cause a rotational speed of the at least one motor generator to increase to augment drive power provided by the internal combustion engine. In some embodiments, to cause the rotational speed of the at least one motor generator to increase, the electronic control unit is further configured to transmit a target engine speed to the at least one motor generator.

In accordance with another embodiment, a method may be performed by an electronic control unit of a vehicle, wherein the electronic control unit comprises at least one processor, and a memory unit operatively coupled to the at least one processor. The memory unit includes computer code that when executed, causes the at least one processor to cause a rotational speed of an internal combustion engine to increase. This is performed in response to a driver of the vehicle using a shift selector to shift from a first one of a plurality of simulated gears to a second one of the plurality of simulated gears. This can be based upon respective simulated gear ratios associated with first and second ones of the simulated gears, wherein the second one of the simulated gears is lower than the first one of the simulated gears. The increased rotational speed of the internal combustion engine augments at least one motor generator operatively coupled to the internal combustion engine to provide drive power to a transmission of the vehicle.

In some embodiments, the computer code that when executed causes the at least one processor to cause the throttle of the internal combustion engine to open to cause the rotational speed of the internal combustion engine to increase, further comprises computer code that when executed, causes the at least one processor to transmit a target engine speed to the internal combustion engine. The target engine speed can be determined by the respective simulated gear ratios. In some embodiments, the target engine speed comprises an engine rotations per minute (RPM) value that varies between each of the plurality of simulated gears. In some embodiments, an RPM rise rate of the internal combustion engine between successive gears of the plurality of simulated gears varies according to at least one of the respective gear ratios characteristics, accelerator pedal actuation, and vehicle speed. In some embodiments, the memory unit includes further computer code that when executed, causes the at least one processor to adjust the target engine speed based on at least one of vehicle speed trajectory and expected vehicle speed upon completion of the shift from the first one of the simulated gears to the second one of the simulated gears.

In some embodiments, the memory unit includes further computer code that when executed, causes the at least one processor to further adjust the target engine speed based on safety considerations pursuant to accelerator pedal actuation.

In some embodiments, the memory unit includes further computer code that when executed, causes the at least one processor to cause a rotational speed of the at least one motor generator to increase to augment drive power provided by the internal combustion engine. In some embodiments, the computer code causing the rotational speed of the at least one motor generator to increase, further comprises computer code that when executed further causes the at least one processor to transmit a target engine speed to the at least one motor generator.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
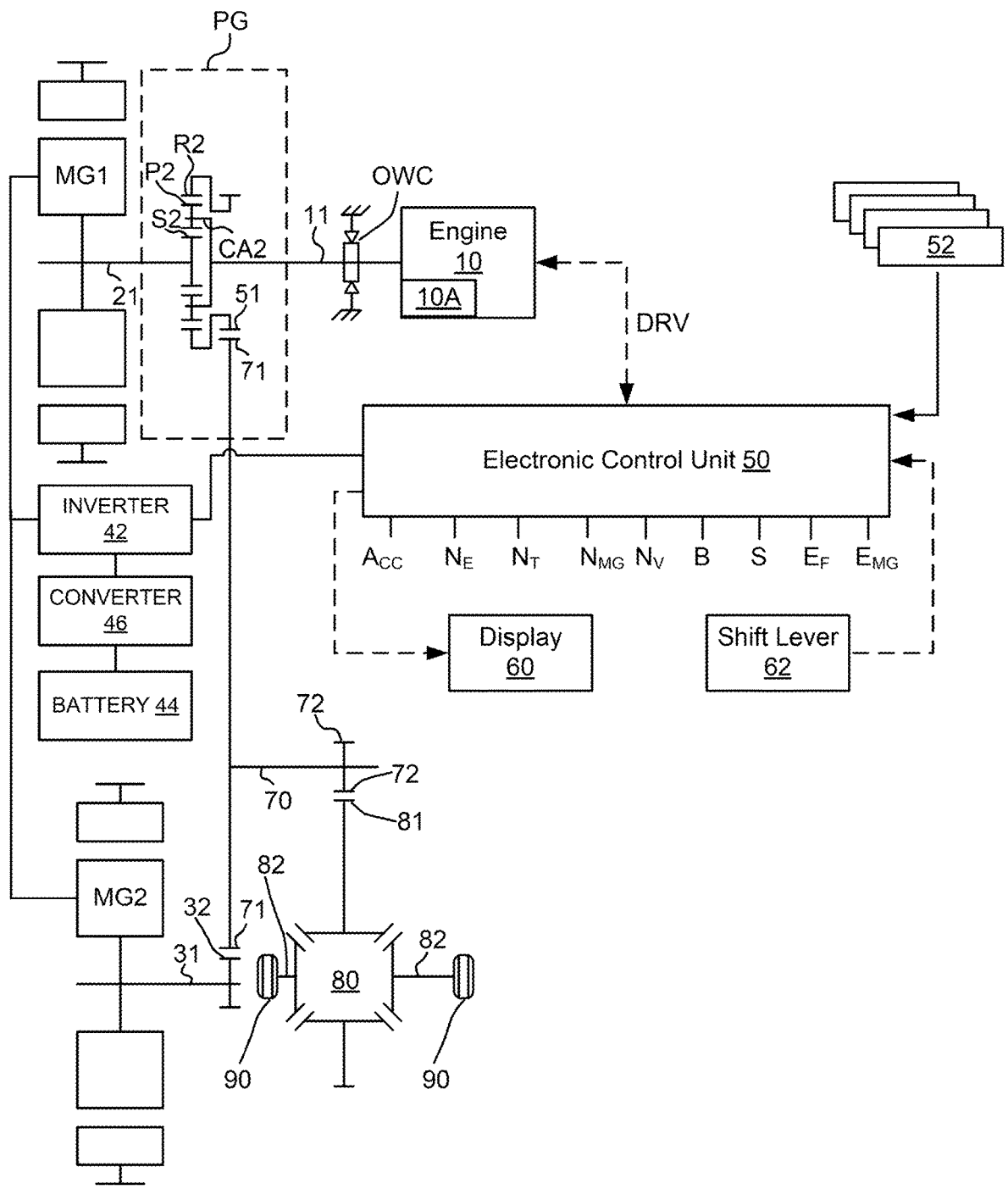
FIG. 1A is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

As alluded to above, HEVs can be provided with a sport mode to provide a more spirited driving experience. However, conventional sport mode implementations in HEVs may still not provide the driving experience desired by certain customers. This can be the result of the engine response in an HEV (when in sport mode) not matching that of a conventional manual transmission or conventional automatic transmission. For example, engine speed in conventional HEVs tends to ramp up slowly after a downshift, which often fails to result in any increased sound/response normally associated with downshifting. Thus, conventional "high engine response" logic that may be used in the sport or sequential shift mode still cannot mimic rev-matching.

Rev-matching can refer to a technique used with conventional manual transmissions for smoothing the transition between gears, increasing the speed of gear changes, and preventing shock loads through the manual transmission when downshifting. To perform rev-matching in a vehicle with a manual transmission, a driver may increase engine rotational speed by opening the throttle and revving the engine during a downshift ("blipping the throttle") to match the increased rotational speed of the transmission required for the new gear—hence the term, rev-match. Doing this avoids the mechanical shock that would result from a mismatch between engine and gear speeds. Rev-matching can also result in certain pleasing noises and increased engine speed.

Other conventional HEV drivetrain implementations may employ some form of simulated rev-matching. One example is disclosed in pending U.S. patent application Ser. No. 16/548,306, the contents of which are incorporated herein by reference in their entirety. However, in HEVs with simulated gear shifting, rev-matching systems do not account for individual gears/gear ratios.

Embodiments of the systems and methods disclosed herein can provide simulated rev-matching, or more generally, added engine response while downshifting during acceleration, in a vehicle having a hybrid drive system, such as a two-motor hybrid system transmission. The two-motor hybrid system transmission may include an electronic control unit that controls the speed of the engine to simulate gears, and increases the speed of the engine responsive to a driver using the gear selector to shift from one of the simulated gears to a lower one of the simulated gears, thereby providing the desired rev-matching experience.

The systems and methods disclosed herein may be implemented with or by any of a number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types as well. Example HEVs in which embodiments of the disclosed technology may be implemented are illustrated in FIGS. 1A and 1B.

Figure 1B:
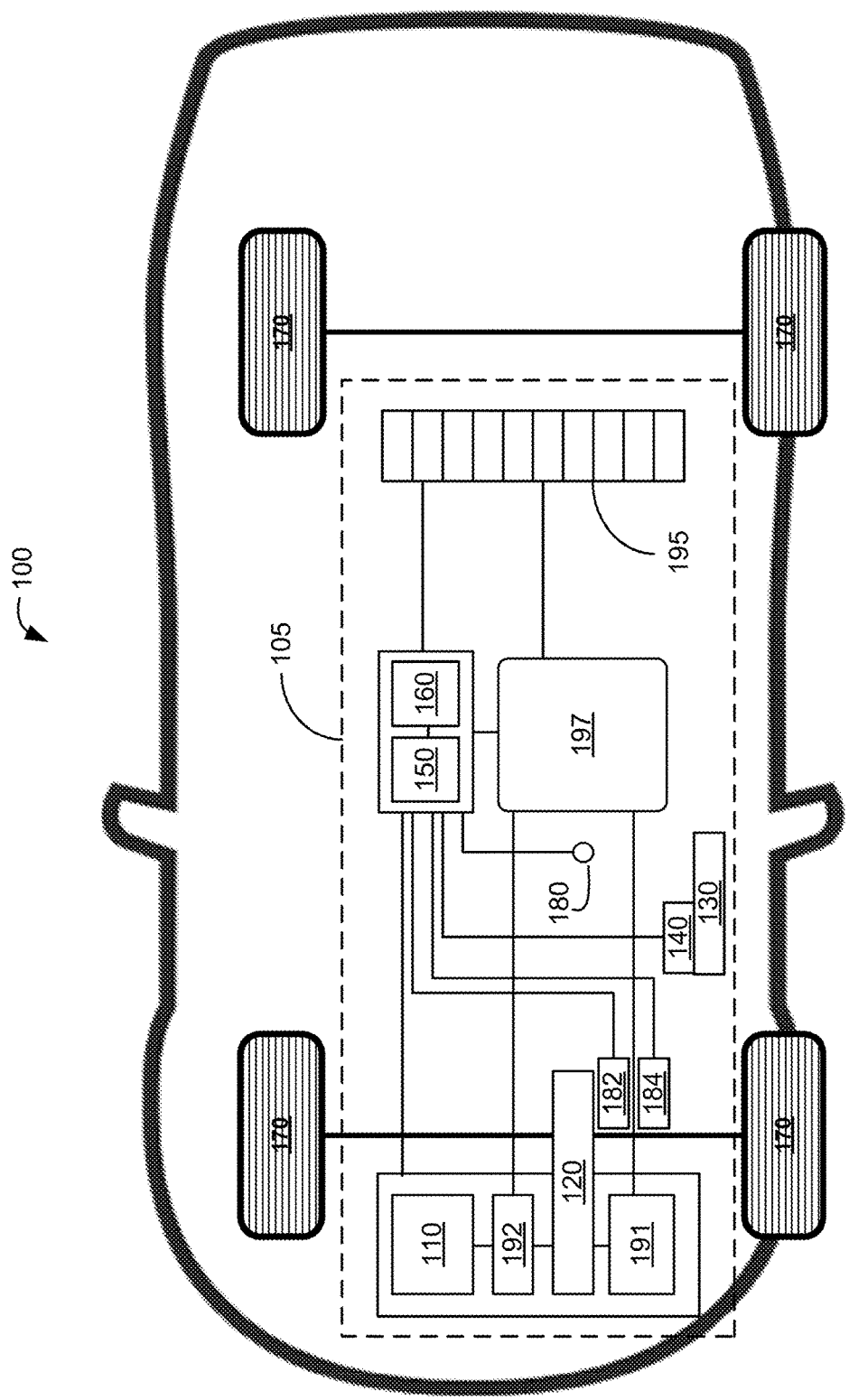
FIG. 1B is a schematic representation of another example hybrid vehicle with which embodiments of the systems and methods disclosed herein may be implemented.

FIG. 1A is a diagram illustrating an overall configuration of a HEV 2 according to one embodiment. HEV 2 may include an engine 10, a motor generator MG1, a motor generator MG2, a power split device (planetary gear device) PG, a counter shaft (output shaft) 70, a differential gear system 80, drive wheels 90, a shift lever 62, a display unit 60, and an Electronic Control Unit (ECU) 50.

HEV 2 may be referred to as a front-engine/front-drive (FF type) hybrid vehicle which moves by using power from at least one of engine 10, motor generator MG1 and motor generator MG2. It should be understood that HEV 2 is not limited to being an FF type hybrid vehicle. For example, HEV 2 may be a front-engine/rear-drive (FR) type hybrid vehicle, as well as an all-wheel drive (AWD) hybrid vehicle. Moreover, HEV 2 may be a plug-in hybrid vehicle mounted with a battery 44 which can be charged by using an external power source (not shown).

Engine 10 may be, for example, an internal combustion engine (ICE) such as a gasoline engine or a diesel engine or similarly powered engine in which fuel is injected into and combusted in a combustion chamber. Engine 10 may be controlled by control signals from ECU 50. For example, an output control circuit 10A may be provided to control engine 10. Output control circuit 10A may include a throttle actuator to control an electronic throttle valve that controls air intake and fuel injection (as a byproduct of controlling air intake), fuel injection, an ignition device that controls ignition timing, and the like. Regarding air intake, it should be understood that generally, the throttle opens allowing air to move into the intake. ECU 50/sensors 52 may measure the airflow into the intake. ECU 50 commands the fuel injectors to output the specific amount of fuel needed to reach the target air to fuel ratio based on driving conditions and engine 10 parameters/characteristics. Output control circuit 10A may execute output control of engine 10 according to a command control signal(s) supplied from ECU 50, as described herein. Such output control can include, for example, throttle control, fuel injection control, and ignition timing control.

ECU 50 may include circuitry to control various aspects of vehicle operation. ECU 50 may include, for example, a microcomputer that includes a one or more processing units (e.g., microprocessors), memory storage (e.g., RAM, ROM, etc.), and I/O devices. The processing units of ECU 50 execute instructions stored in memory to control one or more electrical systems or subsystems in the vehicle. ECU 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

In the example illustrated in FIG. 1A, ECU 50 receives information from a plurality of sensors included in vehicle 2. For example, ECU 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of engine 10 (engine RPM), a rotational speed, $N_{MG1}/N_{MG2}$, of motor generators MG1 and MG2, respectively (motor rotational speed), and vehicle speed, $N_V$. These may also include brake operation amount/pressure, B, steering wheel angle/rotation, S, battery SOC (i.e., the charged amount for the battery detected by an SOC sensor). Accordingly, HEV 2 can include a plurality of sensors 52 that can be used to detect various conditions internal or external to the vehicle and provide sensed conditions to ECU 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG1}$ and $E_{MG2}$, hybrid (engine 10+MG1 and/or MG2) efficiency, etc.

In some embodiments, one or more of the sensors 52 may include their own processing capability to compute the results for additional information that can be provided to ECU 50. In other embodiments, one or more sensors may be data-gathering-only sensors that provide only raw data to ECU 50. In further embodiments, hybrid sensors may be included that provide a combination of raw data and processed data to ECU 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Motor generator MG1 and motor generator MG2 each may be a permanent magnet type synchronous motor including for example, a rotor with a permanent magnet embedded therein. A rotation shaft 21 of motor generator MG1 may be disposed coaxially with a crank shaft 11 of engine 10. A rotation shaft 31 of motor generator MG2 may be disposed parallel to rotation shaft 21 of motor generator MG1. Counter shaft (output shaft) 70 may be disposed parallel to rotation shaft 21 of motor generator MG1 and rotation shaft 31 of motor generator MG2.

Motor generator MG1 and motor generator MG2 may each be driven by an inverter 42. The inverter 42 may be controlled by a control signal from ECU 50 so as to convert direct current (DC) power from battery 44 to alternating current (AC) power, and supply the AC power to motor generators MG1 and MG2. Motor generator MG2 may be driven by electric power generated by motor generator MG1. It should be understood that in embodiments where motors MG1, MG2 are DC motors, no inverter is required. The inverter, in conjunction with a converter assembly 46 may also accept power from one or more of motor generators MG 1, MG2 (e.g., during engine charging), convert this power from AC back to DC, and uses this power to charge battery 44 (hence the name, motor generator). ECU 50 may control the inverter, adjust driving current supplied to motor generator MG2, and adjust the current received from motor generator MG1 during regenerative coasting and braking.

Battery 44 may be implemented as one or more batteries or other power storage devices including, for example, lead-acid batteries, lithium ion, and nickel batteries, capacitive storage devices, and so on. Battery 44 may also be charged by one or more of motor generators MG1, MG2 such as, for example, by regenerative braking or by coasting during which one or more of motor generators MG1, MG2 operates as generator. Alternatively (or additionally, battery 44 can be charged by motor generator MG1, for example, when HEV 2 is in idle (not moving/not in drive). Further still, battery 44 may be charged by a battery charger (not shown) that receives energy from engine 10. The battery charger may be switched or otherwise controlled to engage/disengage it with battery 44. For example, an alternator or generator may be coupled directly or indirectly to a drive shaft of engine 10 to generate an electrical current as a result of the operation of engine 10. Still other embodiments contemplate the use of one or more additional motor generators to power the rear wheels of a vehicle (e.g., in vehicles equipped with 4-Wheel Drive), or using two rear motor generators, each powering a rear wheel.

Battery 44 may also be used to power other electrical or electronic systems in the vehicle. Battery 44 can include, for example, one or more batteries, capacitive storage units, or other storage reservoirs suitable for storing electrical energy that can be used to power motor generator MG1 and/or motor generator MG2. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

Power split device PG can refer to planetary gear device, such as a single pinion type planetary gear device, which may include a sun gear S2, a pinion gear P2, a ring gear R2 and a carrier CA2. Carrier CA2 of power split device PG may be coupled to crankshaft 11 of engine 10. Pinion gear P2 may be disposed between sun gear S2 and ring gear R2, meshing with sun gear S2 and ring gear R2, respectively. Pinion gear P2 may be supported by carrier CA2, capable of undergoing rotation and revolution. Sun gear S2 may be coupled to rotation shaft 21 of motor generator MG1. Ring gear R2 may be coupled to a counter drive gear 51. Counter drive gear 51 can be an output gear of power split device PG, rotating together with ring gear R2.

It should be understood that the rotation speed of sun gear S2 (i.e., the rotation speed of motor generator MG1), the rotation speed of carrier CA2, and the rotation speed of ring gear R2 satisfy a linear relationship collinearly (i.e., once any two of the rotation speeds are determined, the last rotation speed is also determined). Therefore, by adjusting the rotation speed of motor generator MG1, it is possible to alter the ratio between the rotation speed of ring gear R2 and the rotation speed of carrier CA2 continuously.

Counter shaft (output shaft) 70 may be provided with a counter drive gear 71 and a differential drive gear 72. Counter drive gear 71 meshes with counter drive gear 51 of power split device PG. Thus, power from engine 10 and motor generator MG1 can be transmitted to counter shaft (output shaft) 70 via counter drive gear 51 of power split device PG.

Power split device PG may be connected to a point in a power transmission path from engine 10 to counter shaft (output shaft) 70. Therefore, after the rotation of engine 10 is gear-shifted in power split device PG, it can be transmitted to counter shaft (output shaft) 70.

Counter drive gear 71 meshes with a reduction gear 32 coupled to rotation shaft 31 of motor generator MG2. In this way, the power of motor generator MG2 can be transmitted to counter shaft (output shaft) 70 via reduction gear 32.

Differential drive gear 72 meshes with a differential ring gear 81 disposed in differential gear system 80. Differential gear system 80 may be coupled to right and left drive wheels 90 through right and left drive shafts 82, respectively. In other words, the rotation of counter shaft (output shaft) 70 can be transmitted to the right and left drive shafts 82 through differential gear system 80.

In HEV 2, crank shaft 11 of engine 10 is provided with a one-way clutch (OWC). One-way clutch OWC prevents the reverse rotation of engine 10. Thus, when a driver intends to move the vehicle rearward, with the help of one-way clutch OWC, the vehicle can be moved rearward simply by reversely rotating motor generator MG2 without performing any control on engine 10 and motor generator MG1.

The example vehicle illustrated by FIG. 1A is provided for illustration purposes only as one example of a vehicle system with which embodiments of the disclosed technology may be implemented. One of ordinary skill in the art reading this description will understand how the disclosed embodiments can be implemented with other vehicle platforms.

For example, FIG. 1B illustrates another example HEV 100 in which various embodiments for simulating gears and rev matching in accordance with some embodiments may be implemented.

HEV 100 can include drive force unit 105 and wheels 170. Drive force unit 105 may include an engine 110, MGs 191 and 192, a battery 195, an inverter 197, a brake pedal 130, a brake pedal sensor 140, a transmission 120, a memory 160, a processor 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

Like the MGs of FIG. 1A, MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by processor 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The processor 150 (which may be an embodiment of an ECU) controls the transmission 120, utilizing data stored in memory 160 to determine the applied torque delivered to the wheels 170. For example, processor 150 may determine that at a certain vehicle speed, engine 110 should provide a fraction of the applied torque to the wheels while MG 191 provides most of the applied torque. Processor 150 and transmission 120 can control an engine speed ($N_E$) of engine 110 independently of the vehicle speed (V).

Because transmission 120 (and the two-motor hybrid transmission system of FIG. 1A) controls the torque delivered from more than one power source, there are no fixed gear ratios, or gears, as a conventional step transmission would have. Accordingly, processor 150/ECU 50 can simulate gears and simulate shifting gears. Memory 160 (or a corresponding memory of HEV 2 (not shown)) stores target engine speed and acceleration/deceleration torque maps, which contain simulated shift points. The processor 150/ECU 50 can automatically simulate shifts, using target engine speed and deceleration torque maps stored in memory. Alternatively, the driver may use shifter 180 or 62, coupled to the processor 150 or ECU 50, respectively, to manually simulate shifting.

Figure 2A:
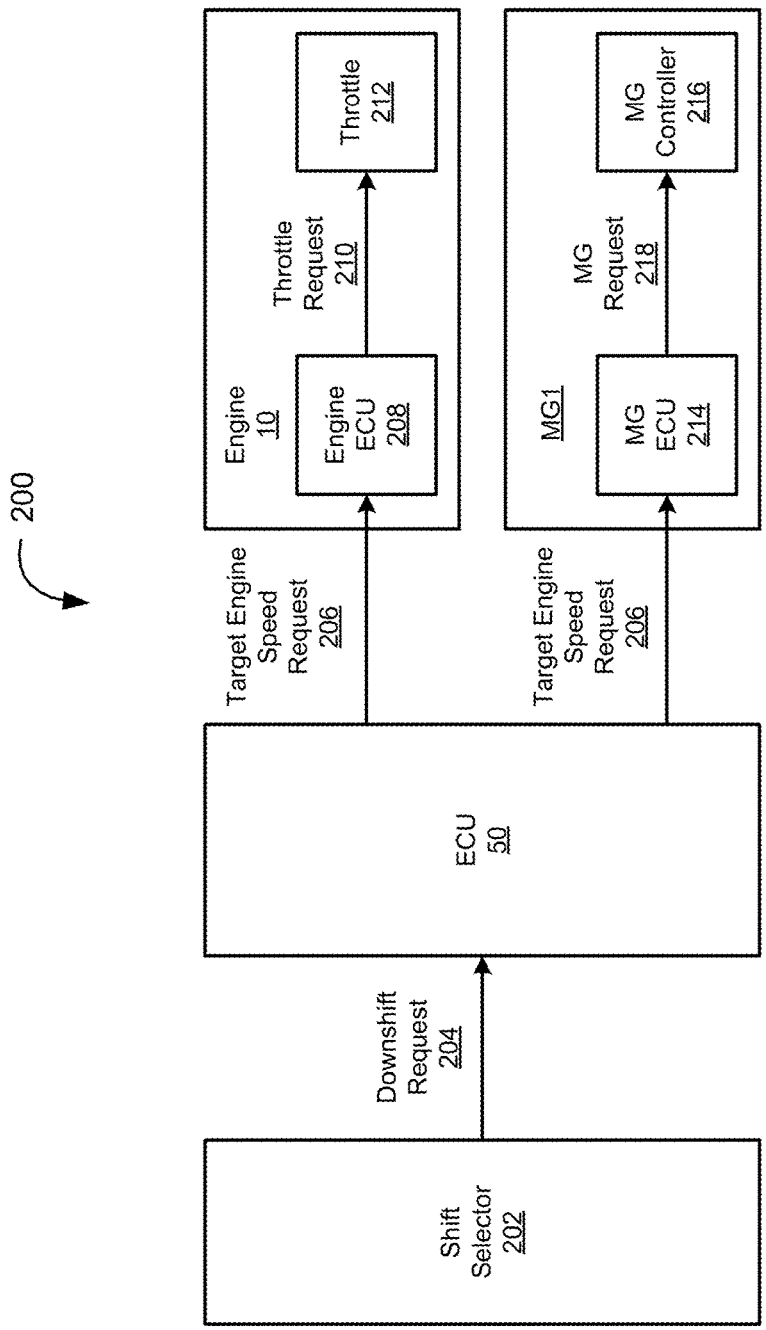
FIG. 2A illustrates an example system for simulated rev-matching according to embodiments of the disclosed technology.

FIG. 2A illustrates a system 200 for providing or effectuating high engine response logic, which in some cases, may include "per-gear" sequential simulated gear calculation and rev-matching in a vehicle, such as HEV 2 of FIG. 1A. It should be understood that the same or similar system is contemplated for providing or effectuating high engine response logic in other vehicles, such as HEV 100 of FIG. 1B.

Referring to FIG. 2A, the system may include a shift selector 202 (which may be an embodiment of shifter 62 of FIG. 1A. A driver may employ the shift selector 202 to select a plurality of simulated gears. Each of the simulated gears may be implemented by controlling the transmission to implement a corresponding simulated gear ratio.

The shift selector 202 may be implemented as a stick shift, one or more steering column paddles, one or more buttons, or the like. In some embodiments, the shift selector 202 may be used to select a particular simulated gear, for example such as third gear. For example, in such embodiments, a stick shift may be moved to any of a plurality of positions, in an H-formation, sequentially, or other manner, each representing one of the simulated gears. In some embodiments, the shift selector 202 may be used shift to a next higher gear, to shift to a next lower gear, or the like. For example, one steering column paddle may be used to shift to a next higher gear, while another steering column paddle may be used to shift to a next lower gear. Other shift selector mechanisms are contemplated.

When the shift selector 202 is used to shift gears, a corresponding signal may be transmitted to the ECU 50. For example, when the shift selector 202 is used to shift to a lower gear, i.e., to downshift, a downshift request 204 is sent to the ECU 50. According to the described technology, the ECU 50 may respond to the downshift request 204 by determining a target engine speed which can be represented or indicated by a target engine speed request, as described below.

In some embodiments, the target engine speed request 206 is sent to the engine 10. Engine 10 may include an engine ECU 208 and a throttle 212 (which may be one embodiment of or be operatively connected to output control circuit 10A of FIG. 1). Responsive to receipt of the target engine speed request 206, the engine ECU 208 may generate a throttle request 210. Responsive to the throttle request 210, the throttle 212 of the engine 10 may open. The opening of the throttle 212 results in an increase in the rotational speed, $N_E$, of engine 10. The sound and acceleration produced by this operation induce sensations in the driver and passengers that simulate those produced by rev-matching using a manual transmission. These sensations and the increased vehicle response are very pleasing to some drivers and passengers.

As noted above, at least one of the two motors generators (MG1, MG2 of FIG. 1A), may be used to propel a vehicle in addition to its engine. In such embodiments, the rotational speed of engine 10 may be increased, not only by opening throttle 212 of engine 10, but also by increasing the rotational speed of the MG1. In such embodiments, the target engine speed request 206 may also be sent to MG1. MG1 may include an MG ECU 214 and an MG controller 216. Responsive to receipt of the target engine speed request 206, MG ECU 214 may generate an MG request 218. Responsive to MG request 218, MG controller 216 may increase a rotational speed of MG1.

As noted above, MG1 may be mechanically coupled to engine 10, for example by a power split/planetary gear system or the like. Therefore, the rotational speed of the engine 10 increases with the rotational speed of motor generator MG1, enhancing the rev-matching sensation described above. It should be understood that MG1 may be in a "motoring" mode, where MG1 provides torque to engine 10 to assist with increasing the RPMs of engine 10 while at the same time, engine 10 increases its own speed via throttle control. It should also be understood that inverter 42 is operative to allow MG1 to provide the aforementioned torque to engine 10.

Figure 2B:
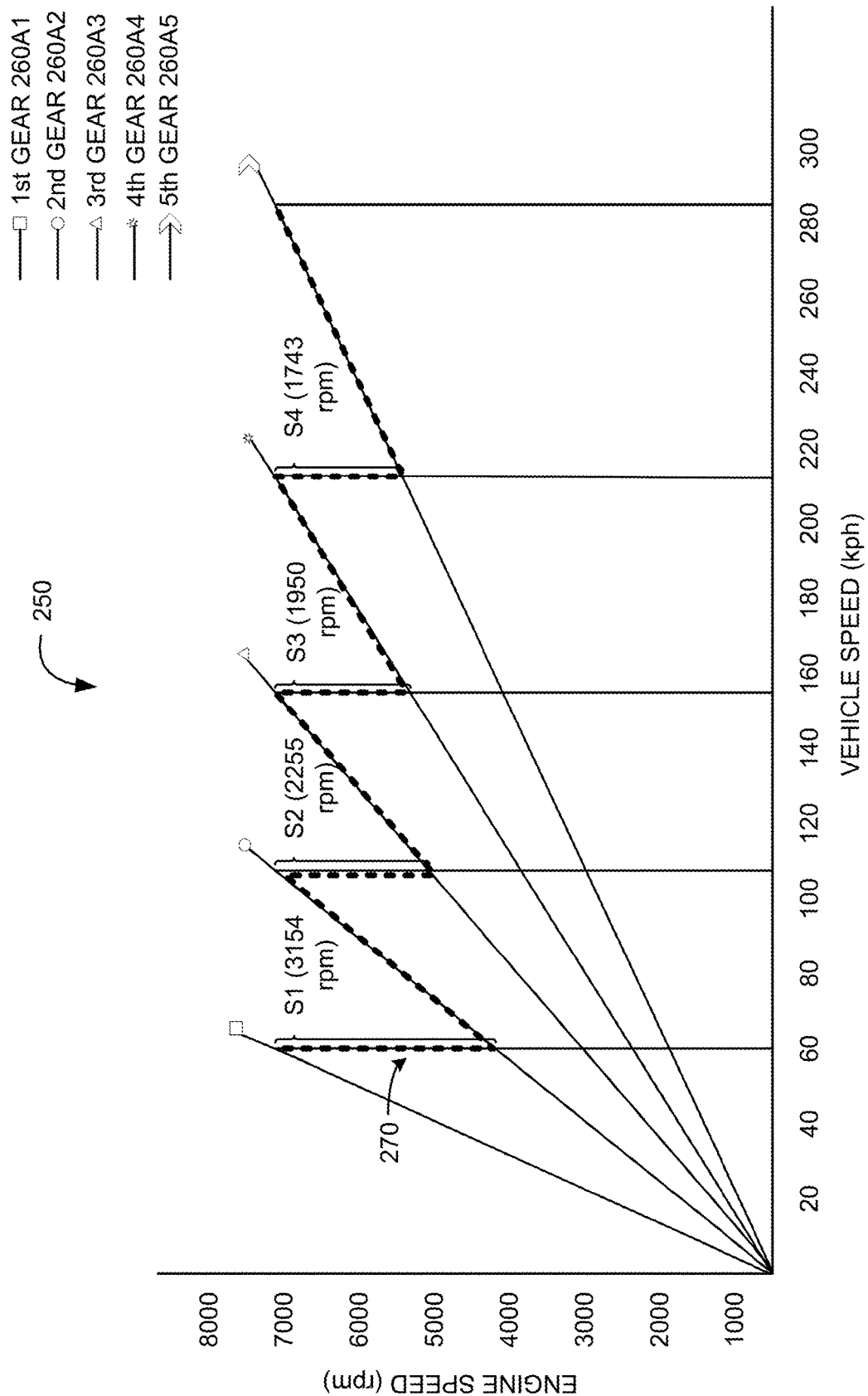
FIG. 2B illustrates an example of a conventional engine speed-to-vehicle speed mapping.

Determining a target engine speed on which to base target engine speed request 206 may be accomplished by way of target engine rate speed map, an example of which is illustrated in FIG. 2B. Target engine rate speed map 250 in FIG. 2B shows the target engine speed ($N_E$) in revolutions per minute (rpm) for each simulated gear along the y axis versus vehicle speed in kilometers per hour (kph) along the x axis. These target engine speeds follow a roughly linear relationship to vehicle speed to simulate conventional step transmission behavior. It should be noted that engine speed is linearly fixed by the following function, whereby engine speed increases linearly based on a particular gear ratio (in a conventional step transmission).

Engine_RPM to Speed (kph)
=Engine_RPM*$Pi$*2*TireRadius*60 min/hr/
(GearRatio*FinalDriveRatio*1000 m/km)

A simulated shift point corresponds to the vehicle speed at which a step transmission would shift gears. However, the vehicle speeds for the simulated, user-selected shift points may differ from the vehicle speeds for a step transmission's shift points. FIG. 2B illustrates the simulated shift points for upshifting an HEV, such as HEV 2. In this implementation, the first simulated shift point S1-2 is approximately 60 kph, the second simulated shift point S2-3 is approximately 108 kph, the third simulated shift point S3-4 is approximately 155 kph, and the fourth simulated shift point S4-5 is approximately 212 kph. It should be noted that the illustrated shift points are maximum shift points, but a driver may shift gears anywhere along the gear ratio lines.

The simulated gears are represented by the first simulated gear 260A1, the second simulated gear 260A2, the third simulated gear 260A3, the fourth simulated gear 260A4, and the fifth simulated gear 260A5. A simulated gear corresponds to the target engine speed for a given vehicle speed if the HEV were using that gear ratio. For example, if the HEV 2 was traveling at approximately 80 kph in second gear, the engine speed would be approximately 5500 rpm.

HEV 2 may be configured to automatically shift between the simulated gears. The automatic shift curve in FIG. 2B illustrates automatic shifting from the first simulated gear 260A1 to the fifth simulated gear 260A5. The automatic shift curve illustrates the engine speed as the vehicle speed increases, and HEV 2 automatically upshifts. For example, as the HEV 2 accelerates from a standstill (0 kph), the engine speed increases along the first simulated gear 260A1. When HEV 2 reaches the first simulated shift point S1-2, the engine speed is reduced, following the second simulated gear 260A2. Similarly, the engine speed increases linearly as vehicle speed increases and is then reduced at the second simulated shift point S2-3, the third simulated shift point S3-4, and the fourth simulated shift point S4-5. This is tracked by dotted line 270.

Figure 2C:
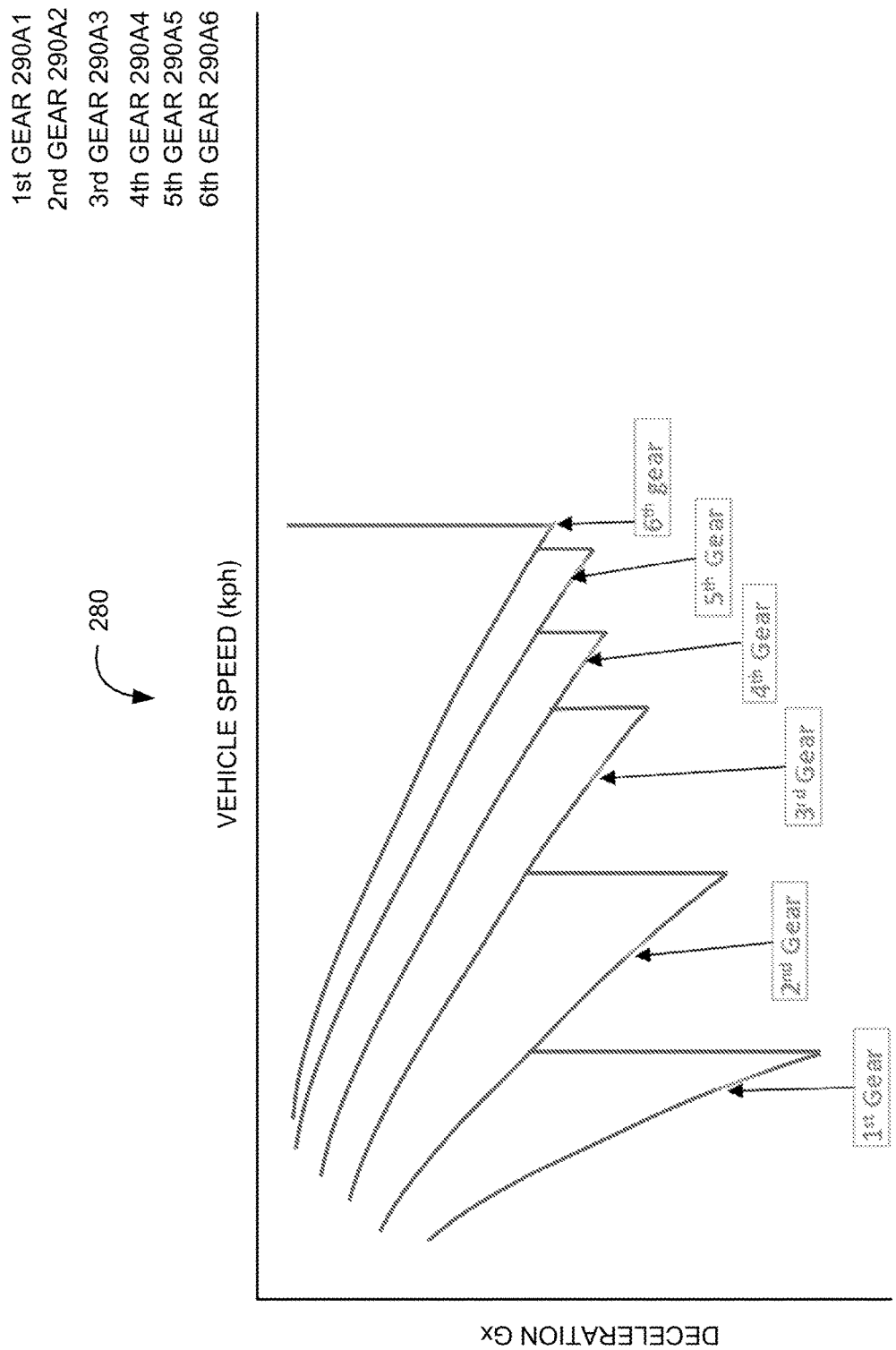
FIG. 2C illustrates an example deceleration map.

Similarly, as another example, FIG. 2C illustrates a deceleration map 280, where HEV 100 may have 6 gears. As the HEV 100 decelerates from a higher speed, such as 100 kph, the engine speed decreases along the sixth simulated gear 290A6. When the HEV 100 reaches a simulated shift point and the driver applies enough brake pressure to activate an automatic downshift, the engine speed is increased, following the fifth simulated gear 290A5, and further downshifts through, e.g., remaining gears 290A4, 290A3, 290A2, 290A1 as the vehicle speed is reduced. These changes in engine speed are similar to the changes in engine speed exhibited by a vehicle with a step transmission. It should be noted that as illustrated in FIG. 2B and FIG. 2C, the lower the gear, the larger the "step" change or differential rpm between gears.

The changes in engine speed simulate a shifting experience for the driver. The driver would be accustomed to changes in engine noise corresponding to the changes in engine speed. For example, the engine noise created by running the engine at the speeds along automatic shift curve is similar to shifting a vehicle with a step transmission. Higher engine speeds produce louder engine noise. Drivers may associate louder engine noise and response with more aggressive performance and power.

Figure 3:
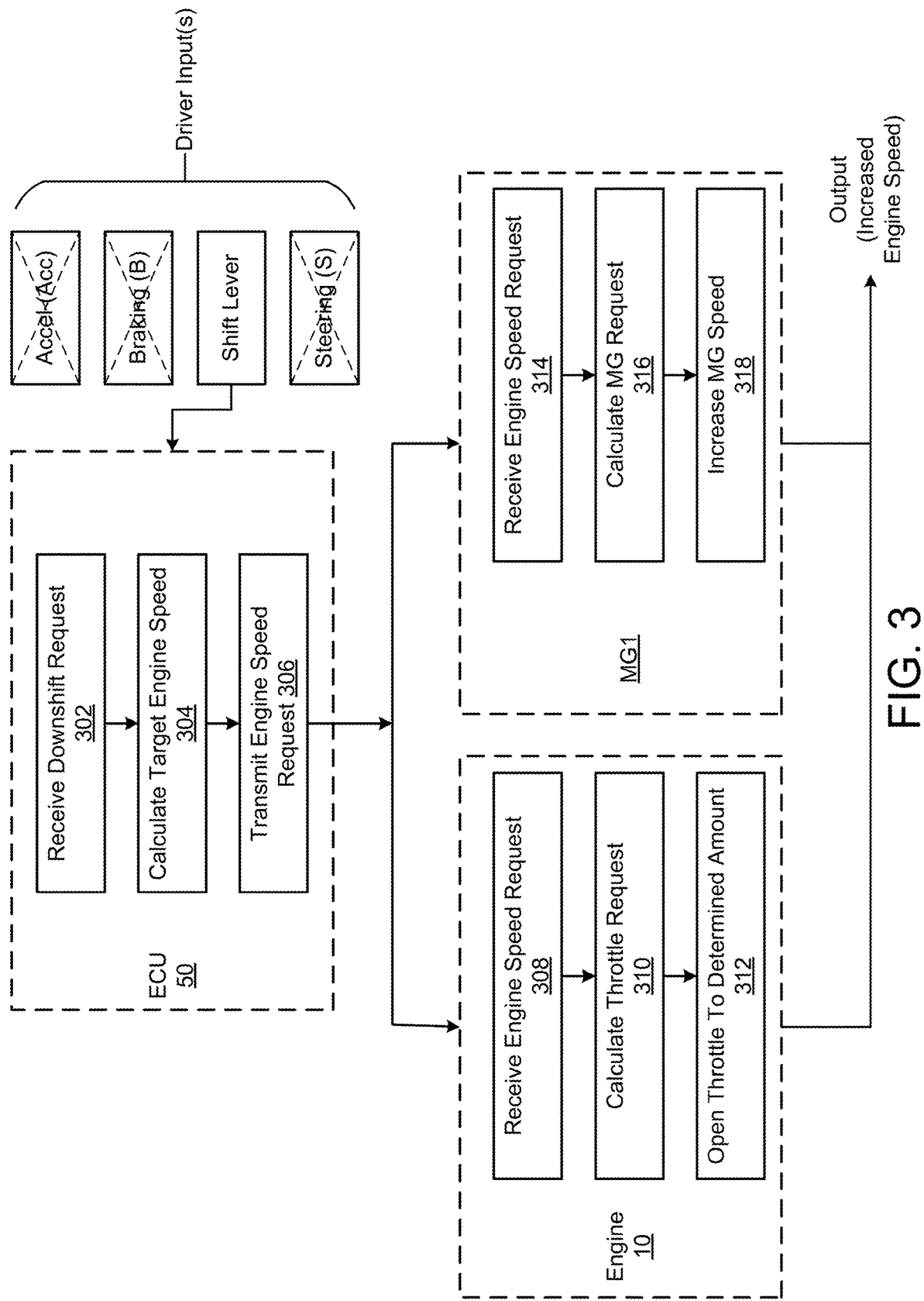
FIG. 3 illustrates example operations of the system of FIG. 2A for simulated rev-matching according to embodiments of the disclosed technology.

FIG. 3 illustrates example operations that may be performed by a system to simulate rev-matching in a vehicle according to embodiments of the disclosed technology. In FIG. 3, the operations are grouped according to components of the system (which may be an embodiment of system 200 of FIG. 2A), and will be described in conjunction with FIG. 2A. In particular, operations 302-306 may be performed by the ECU 50, operations 308-312 be performed by engine 10, and operations 314-318 may be performed by MG1.

Referring to FIG. 3, the ECU 50 may receive a downshift request 204, at 302. The downshift request 204 may be generated as described above, e.g., by a driver using a shift lever to simulate downshifting. It should be understood that other driver inputs that might normally prompt a change in engine speed in a conventional engine-only vehicle, may, in some embodiments be ignored, e.g., accelerator pedal actuation, brake pedal actuation, and steering rotation/angle. It should be understood that at or around the moment that the simulated downshift request 204 occurs, driver throttle can generally be ignored. However, after the downshift is completed, the driver will have full control over engine 10 speed, the output of the two motor hybrid system transmission, etc. This is because engine 10 speed should have a specific target engine speed at the moment of the simulated downshift, and any change in target engine speed during the simulated downshift may feel like transmission slippage which can be undesirable. Current vehicle speed, road grade, and throttle position for example, can be considered by ECU 50 at the time the target engine speed (indicated by a target engine speed request) is calculated or set. That is, the target engine speed can be preemptively raised/lowered based on vehicle speed trajectory and expected vehicle speed at the end of the simulated downshift. Still other factors that can be considered include, for example, engine 10 temperature, battery 44 state of charge, mechanical limitations, and the like. Accordingly, and responsive to receiving the downshift request 204, the ECU 50 may calculate a target engine speed request 206, at 304. The target engine speed request 206 may be calculated based upon a number of factors. The factors may include engine temperature, battery state of charge, mechanical limitations, and the like.

It should be noted that the engine response can be customized or otherwise adjusted/altered based off of driver needs and/or specific driver requests, albeit so long as they remain within the mechanical limitations of the transmission. That is, a driver or manufacturer may wish to provide special or multi-leveled modes that provide different engine response characteristics. For example, the two motor hybrid system transmission may in some embodiments, simulate even closer gear ratios keeping engine 10 within a tighter range of its peak powerband, e.g., a "super" sport mode.

Alternatively, in some embodiments, the factors may include a position of the accelerator pedal of the vehicle, i.e., the more the accelerator pedal of the vehicle is depressed, the higher a target engine speed 206 may be generated. It should be noted that in such embodiments, the target engine speed is determined by the ratio of the desired simulated gear that can be actuated by the gear selector, where the amount of accelerator pedal actuation can be factored in as a safety consideration. For example, a driver may be operating vehicle 2 in a "lower" gear commanding less engine 10 RPMs and less responsiveness, but segues into a 100% throttle condition to avoid an accident, speed up to merge, etc. Vehicle 2 may respond by simulating the requested downshift to the lowest possible simulated gear and providing maximum drive force/powertrain response.

In some embodiments, the factors may include a property of the selected simulated gear, a property of the previously-selected simulated gear, or both. In some embodiments, the property may include a gear ratio implemented by the simulated gear. In such embodiments, for example, a higher target engine speed 206 may be implemented for a lower gear ratio than for a higher gear ratio, i.e., engine speed should increase after a downshift in a conventional, manual transmission car, and it is during this scenario when rev-matching may be performed, and in the case of various embodiments disclosed herein, when rev-matching can be simulated. In other embodiments, the factors may include axle ratio and/or tire size (e.g., width, rim diameter, tire diameter, etc.).

Figure 4A:
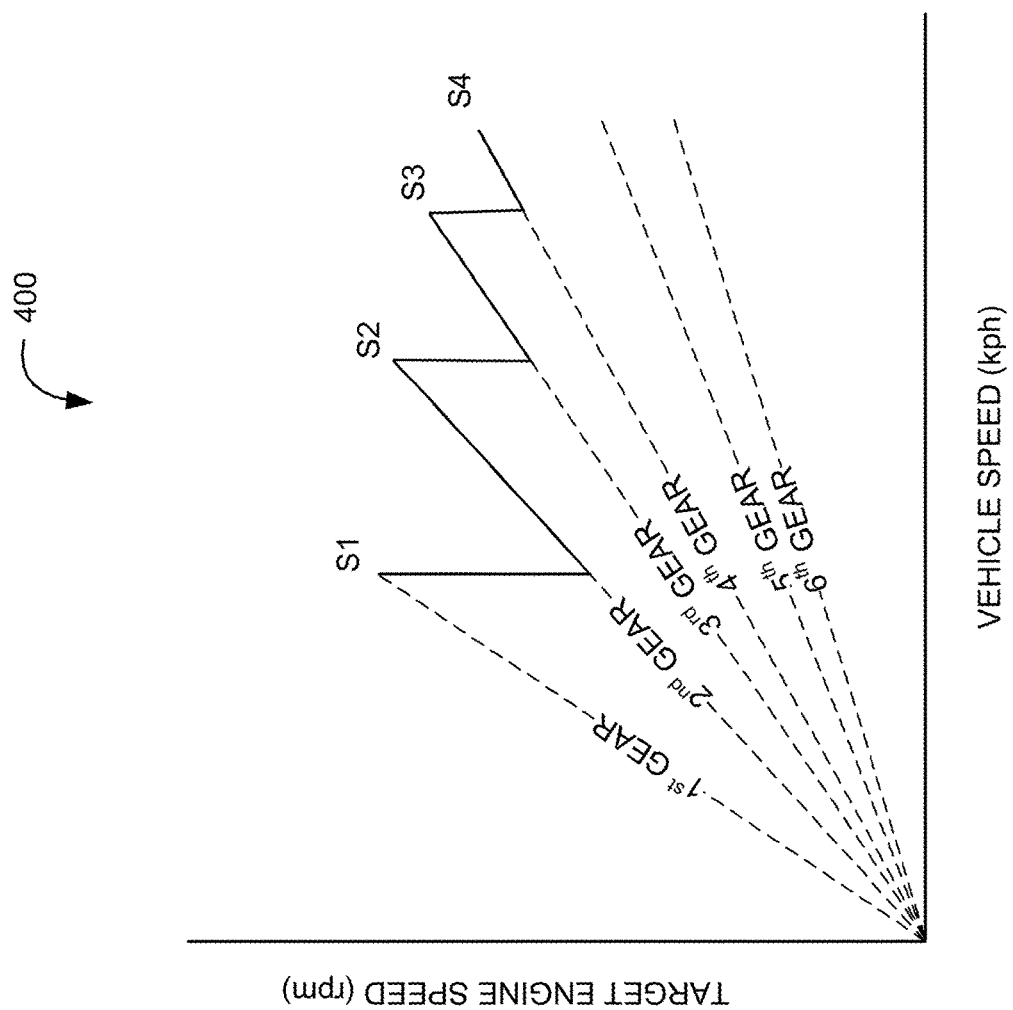
FIG. 4A illustrates an example target engine speed mapping in accordance with various embodiments of the disclosed technology.

For example, FIG. 4A illustrates an example target engine speed map 400 that can be used to determine particular target engine speeds during shifts, e.g., downshifts, between simulated gears in accordance with various embodiments. That is, a particular target engine speed can be determined or selected, based on target engine speed map 400, and that target engine speed may be used as a target engine speed request (alluded to above and described in greater detail below). A target engine speed can be selected based on the step change between gears, e.g., between first gear and second gear, that may be different from a target engine speed that is selected based on the step change between third and fourth gear. This is the case because the step change or rpm differential (S1-2) between first and second gear is greater (necessitating a higher target engine speed to effectuate rev-matching) than that between third and fourth gear (S3-4). The amount by which engine speed is increased during a downshift between simulated third and fourth gears is less than the amount by which engine speed is increased during a downshift between simulated first and second gears.

The table below reflects example target engine speeds in each gear based on vehicle speed (downshifting and upshifting).

| Input Vehicle Speed (kph) | |
| --- | --- |
| $N_E$ in 1st Gear | 8723.00 |
| $N_E$ in 2nd Gear | 5837.20 |
| $N_E$ in 3rd Gear | 4263.12 |
| $N_E$ in 4th Gear | 3279.32 |
| $N_E$ in 5th Gear | 2426.70 |
| $N_E$ in 6th Gear | 1639.66 |

It should be noted that if the target engine speed results in values exceeding certain engine characteristics, such as mechanical limitations of the powertrain, e.g., an engine speed that exceeds the engine redline, the ECU may reject or deny a proposed target engine speed. In some embodiments, the ECU may allow an engine speed as close as possible to the desired target engine speed.

The table below reflects example engine speed differences or gaps (changes in engine RPM) between each gear (again, downshifting and upshifting). It should be understood that engine RPM increases (up-revs) during a downshift, and decreases (de-revs) during an upshift.

| Gear Speed RPM Difference/Change | |
| --- | --- |
| 1st & 2nd Gear Difference | 2885.81 |
| 2nd & 3rd Gear Difference | 1574.08 |
| 3rd & 4th Gear Difference | 983.80 |
| 4th & 5th Gear Difference | 852.62 |
| 5th & 6th Gear Difference | 787.04 |

It should be understood that engine speed can refer to the linear engine speed in relation to gear ratios. During a downshift, the target engine speed is the numerically lower gear's engine speed at a specific vehicle speed. The engine speed rate can refer to how quickly the engine speed increases between gears during the downshift. That is, at the shift points S1, S2, S3, S4 (corresponding to the vertical lines), during a downshift, the amount by which engine speed increases is not instantaneous. Accordingly, it is desirable to have the engine speed increase more quickly for lower gears and slightly slower for the higher gears.

Figure 4B:
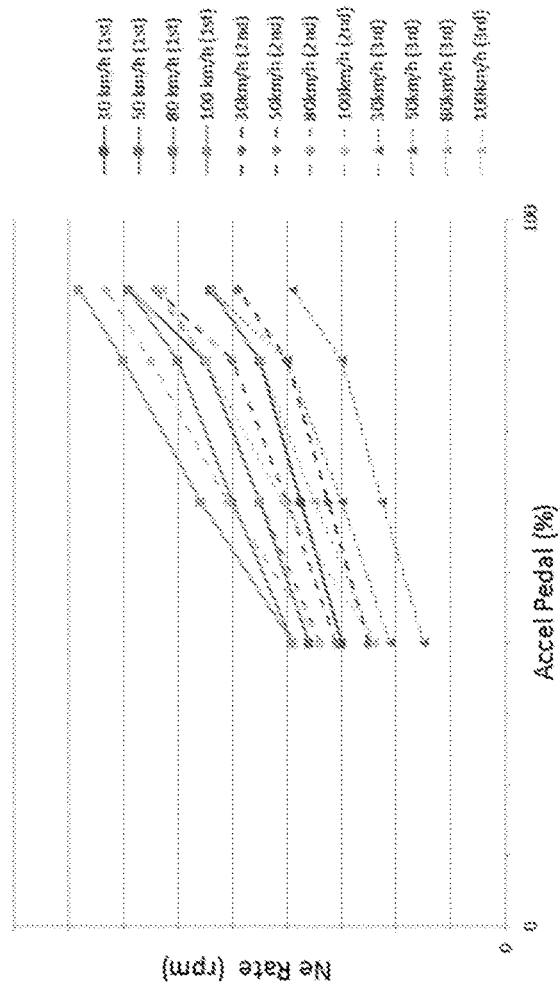
FIG. 4B illustrates an example target engine speed rate-to-accelerator pedal mapping according to embodiments of the disclosed technology.

In this way, the accuracy of rev-matching performed in an HEV is greater than for example, merely applying a single, selected target engine speed across all simulated gears. For example, FIG. 4B illustrates example engine speed rates as a function of accelerator pedal actuation (a percentage thereof). As illustrated in FIG. 4B, depending on the particular gear HEV 2 is operating in, there can be different levels of engine speed rates that apply. It should be understood that an engine speed request can refer to a request that reflects the desired target engine speed/engine speed rate. A target engine speed rate can refer to a "final" target engine speed, the engine speed/engine speed rate being how that final target engine speed is achieved.

The ECU 50 may transmit the target engine speed request 206, at 306. The throttle request 210 may be calculated based upon the target engine speed request 206. This calculation for throttle request 210 can be based on the mechanical capabilities of engine 10 and the RPM rise rate of engine 10 in the wide open throttle condition while being augmented by the addition of MG1 torque. This RPM rise rate (i.e., the engine speed rate) of engine 10 can be varied between gears, speed, and accelerator pedal actuation in accordance with some embodiments.

The throttle request 210 may be calculated based upon a number of other factors as well. The factors may include engine temperature, mechanical limitations, and the like. For example, with lower engine 10 temperatures, it would be undesirable to rev engine 10 as high (compared to a scenario in which engine 10 temperatures were higher) in order to limit wear/high load. Accordingly, one or more of the simulated gears that, if engaged, would surpass the RPM limit of engine 10 at the given engine temperature, can be locked out. Thus, the throttle request calculation for each gear would be the same, but certain simulated gear ratios would be locked out. The same or similar gear/gear ratio lockouts can be implemented in light of certain mechanical limitations of vehicle 2 when attempting to simulate rev-matching to provide the improved engine response disclosed in various embodiments.

Engine 10 may open its throttle 212 to the determined amount responsive to the throttle request 210, at 312. The amount of throttle opening may be included in the throttle request 210. The duration of throttle opening may also be included in the throttle request 210. The throttle request 210 may also specify a final throttle setting to be implemented following the throttle opening. Ultimately, the throttle request comprises one or more values, settings, and/or parameters that can be used to effectuate the desired target engine speed calculated above.

As described above, some embodiments employ MG1, in addition to engine 10, to increase engine speed. In such embodiments, MG1 may receive the target engine speed request 206 transmitted by the ECU 50, at 314. Again, in some embodiments the target engine speed request 206 can reflect a target engine speed that is specific to the simulated gears being used at the time of downshifting. Responsive to receiving the target engine speed request 206, the MG ECU 214 may calculate an MG request 218, at 316, which can comprise a request for increased torque. The MG request 218 may be calculated based upon the target engine speed request 206. The MG request 318 may be calculated based upon a number of other factors as well, including but limited to current engine speed, mechanical limitations, and the like. Calculation of the MG request 318 may be performed similarly to the manner in which throttle request 210 is calculated. It should be understood that various embodiments of the present disclosure can also be applied to upshifting as well. That is, when a driver upshifts, the disclosed technology can perform a rev-down (or de-rev matching). It should be noted that the engine speed-to-gear ration relationship still applies, although a driver would not normally rev when upshifting.

Responsive to the MG request 218, the MG controller 216 may increase the rotational speed of MG1. Because MG1 is operatively/mechanically coupled to engine 10 vis-à-vis shaft 21, this increase in rotational speed of MG1 increases the rotational speed of engine 10. Whether by way of opening a throttle and/or by using an MG to add energy, the output of system 200/the method of FIG. 3 is increased engine speed, which results in, e.g., increased noise/sound and rev'ing of engine 10 to simulate rev-matching.

With conventional HEVs, for example, when a driver of a vehicle requests a downshift 204 (e.g., at a time T0), without any logic to control engine response, the target engine speed request 206 is set to "slowly" or gradually ramp up, which doesn't necessarily comport with down-shifting in, e.g., engine-only vehicles. With conventional HEV engine response logic, the target engine speed request 206 is set to ramp up more quickly by a time, T1. It should be understood that target engine speed request 206 can refer to a derivative of actual engine speed indicating how quickly engine speed is changing, e.g., decreasing. Current HEV engine response logic sends (e.g., via ECU) a target engine speed request to achieve a target engine speed via target engine speed rate.

With current implementations of engine response logic in HEVs, additional torque may be generated by an MG, and hence, an MG request 218 may be generated. Without current HEV engine response logic, no torque is requested of the MG, and with current HEV engine response logic, additional torque is requested after the time T0, and the additional torque is cut off by the time T1. In terms of the impact of the current engine response logic on actual engine speed, it can be appreciated that engine speed may ramp up, but the ramp up does not match the target engine speed. Hence, as described above, current engine response logic (based on MG torque alone) cannot be used to accurately simulate rev-matching, and the increased auditory impact (increased engine noise/sound) and response cannot be achieved.

In contrast, the engine response logic disclosed herein, according to various embodiments, is able to simulate rev-matching, and do factoring in particular simulated gears. That is, by engaging throttle response (and in some embodiments by also engaging MG1 to provide additional torque), actual engine speed can be made to match or at least more closely match the target engine speed. Engine noise/sound is increased which also assists in better simulating the rev-matching experience desired by some drivers of HEVs.

Figure 5:
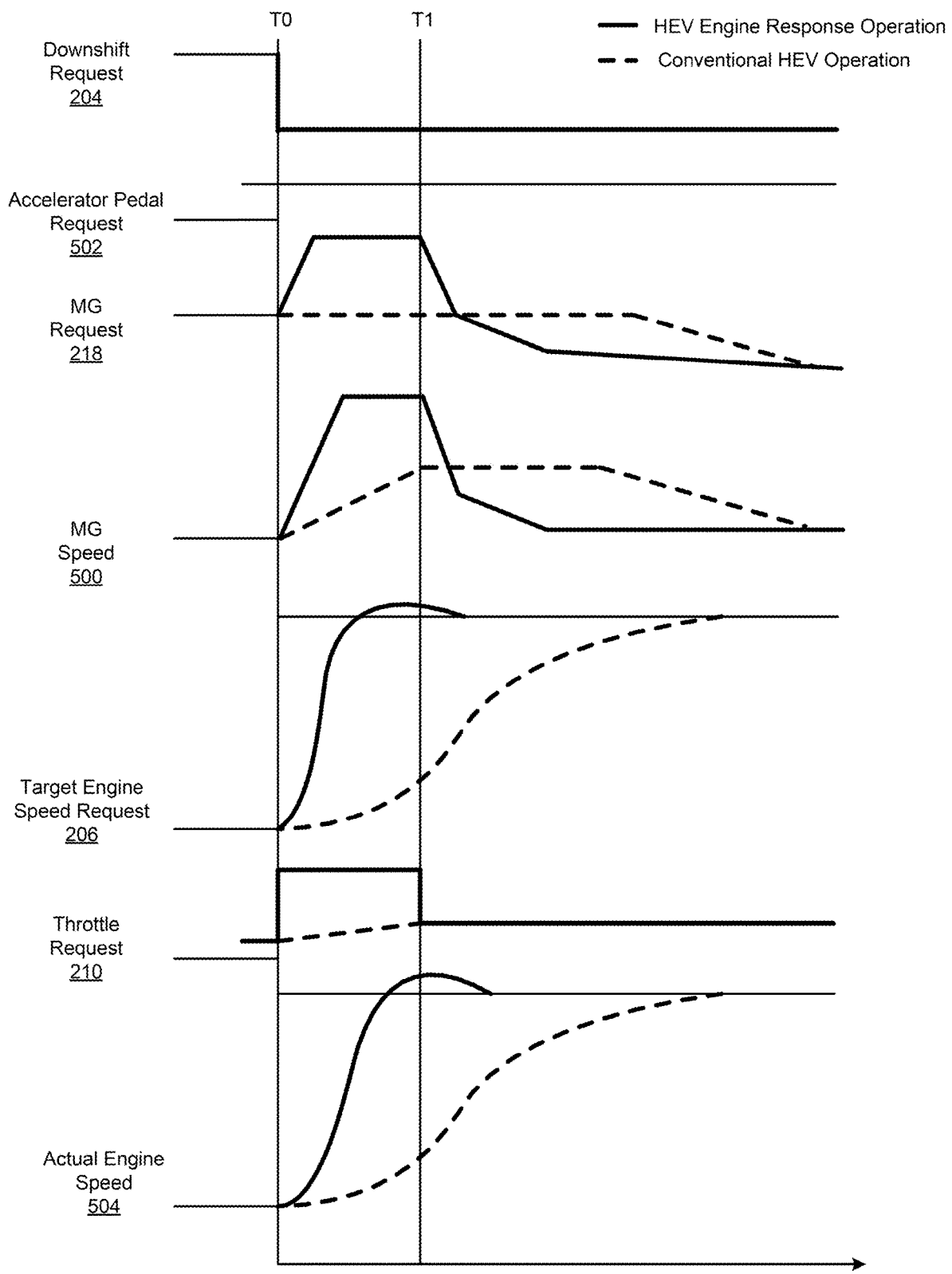
FIG. 5 is a graphical illustration of a timeline reflecting engine response logic in accordance with various embodiments of the disclosed technology.
Figure 6:
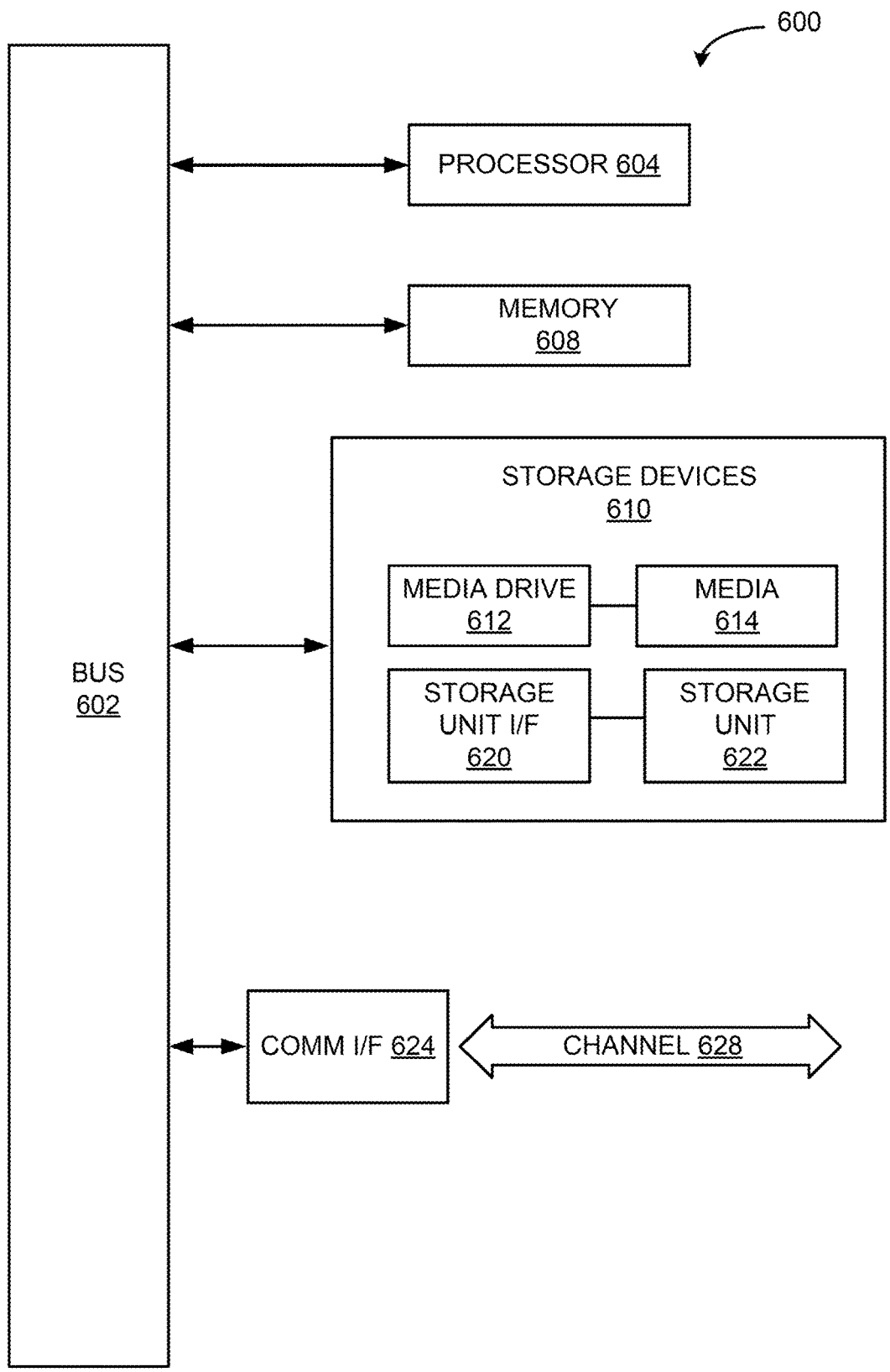
FIG. 6 is an example computing component that may be used to implement various features of embodiments described in the present disclosure.

FIG. 5 is a graphical illustration of a timeline reflecting example high engine response logic disclosed herein. Such logic may be performed/executed by system 200 of FIG. 2. A driver of a vehicle, e.g., vehicle 2 of FIG. 2 may actuate a shift lever (to simulate a downshift) as described above, and a downshift request 204 can be generated at time T0. As also described above, in response to a downshift request, a target engine speed is calculated (which can be specified by way of a desired/target engine speed request 206). Without high engine response logic, the target engine speed represented by the dashed line corresponds to a gradual or "slow" ramp up. In contrast, the target engine speed request 206, when high engine response logic is enabled via system 200 of FIG. 2, results in better/higher engine response evidenced by the steeper curve between times T0 and T1.

In some embodiments, torque generated by a motor generator, e.g., motor generator MG1, may be used to assist in increasing engine speed to better comport with the target engine speed vis-à-vis target engine speed request 206. As described above, the additional torque generated in response to MG request 218 may be used to increase the speed of engine 10. That is, upon receipt of a target engine speed request 206 at operation 314 of FIG. 3, MG request 218 may be calculated at operation 316 of FIG. 3, and torque output from motor generator MG1 can be increased at operation 318 of FIG. 3. It should be noted that the MG request 218 calculation may depend on the simulated gear ratio, target engine speed, vehicle speed, battery SOC, temperature limitations, etc. This increase in torque is reflected between times T0 and T1, and is shown in FIG. 5 as MG speed 500.

Moreover, engine speed may be increased through throttle control. As described above, upon receiving downshift request 204, ECU 50 of vehicle 2 calculates the target engine speed, which can be transmitted to the ECU 208 of engine 10 in the form of target engine speed request 206, whereupon a throttle request 210 can be calculated at operation 310, resulting in the throttle 212 opening at operation 312. As a result of the throttle 212 opening (and if implemented, additional torque from motor generator MG1), actual engine speed 504 is increased. It should be appreciated that the result is increased engine speed such that actual engine speed 504 more closely matches the target engine speed request 206 between times T0 and T1. It should be understood that driver input, such as accelerator pedal request 502 may be ignored. That is, the driver of vehicle 2 may depress the accelerator pedal, but the accelerator pedal's actuation is not a factor or consideration when calculating target engine speed 206 and increasing engine speed to actual engine speed 504 (although it may be used to determine the engine speed increase rate). Rather, the simulated rev-matching (matching actual engine speed response to target engine speed response) is achieved by calculating the target engine speed request 206 in light of operating temperature, battery SOC, certain constraints if applicable, etc., and using motor generator MG1 and/or opening throttle 212 to increase the speed of engine 10, reflected, e.g., by a target engine speed rate-to-accelerator pedal mapping, such as that illustrated in FIG. 4B.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
an internal combustion engine, the internal combustion engine having a throttle;
at least one motor generator operatively coupled to the internal combustion engine;
a transmission receiving drive power from at least one of the internal combustion engine and the at least one motor generator;
a shift selector to enable a driver of the vehicle to select a plurality of simulated gears of the transmission; and
an electronic control unit configured to cause a rotational speed of the internal combustion engine to increase, responsive to the driver of the vehicle using the shift selector to shift from a first one of the simulated gears to a second one of the simulated gears based upon respective simulated gear ratios associated with the first and second ones of the simulated gears, wherein
the second one of the simulated gears is lower than the first one of the simulated gears,
the electronic control unit is further configured to cause a rotational speed of the at least one motor generator to increase to augment drive power provided by the internal combustion engine, and the electronic control unit is further configured to transmit a target engine speed to the at least one motor generator.

2. The vehicle of claim 1, wherein, to cause the throttle of the internal combustion engine to open to cause the rotational speed of the internal combustion engine to increase, the electronic control unit is further configured to transmit a target engine speed to the internal combustion engine, the target engine speed being determined by the respective simulated gear ratios.

3. The vehicle of claim 2, wherein the target engine speed comprises an engine rotations per minute (RPM) value that varies between each of the plurality of simulated gears.

4. The vehicle of claim 2, wherein an RPM rise rate of the internal combustion engine between successive gears of the plurality of simulated gears varies according to at least one of the respective gear ratios characteristics, accelerator pedal actuation, and vehicle speed.

5. The vehicle of claim 2, wherein the target engine speed is adjusted based on at least one of vehicle speed trajectory and expected vehicle speed upon completion of the shift from the first one of the simulated gears to the second one of the simulated gears.

6. The vehicle of claim 5, wherein the target engine speed is further adjusted based on safety considerations pursuant to accelerator pedal actuation.

7. A method performed by an electronic control unit of a vehicle, the electronic control unit comprising:
   at least one processor; and
   a memory unit operatively coupled to the at least one processor including computer code that when executed, causes the at least one processor to perform the following:
      cause a rotational speed of an internal combustion engine to increase, responsive to a driver of the vehicle using a shift selector to shift from a first one of a plurality of simulated gears to a second one of the plurality of simulated gears based upon respective simulated gear ratios associated with first and second ones of the simulated gears, wherein the second one of the simulated gears is lower than the first one of the simulated gears, wherein the increased rotational speed of the internal combustion engine augment at least one motor generator operatively coupled to the internal combustion engine to provide drive power to a transmission of the vehicle; and
      cause a rotational speed of the at least one motor generator to increase to augment drive power provided by the internal combustion engine.

8. The method of claim 7, wherein the computer code that when executed causes the at least one processor to cause the throttle of the internal combustion engine to open to cause the rotational speed of the internal combustion engine to increase, further comprises computer code that when executed, causes the at least one processor to transmit a target engine speed to the internal combustion engine, the target engine speed being determined by the respective simulated gear ratios.

9. The method of claim 8, wherein the target engine speed comprises an engine rotations per minute (RPM) value that varies between each of the plurality of simulated gears.

10. The method of claim 8, wherein an RPM rise rate of the internal combustion engine between successive gears of the plurality of simulated gears varies according to at least one of the respective gear ratios characteristics, accelerator pedal actuation, and vehicle speed.

11. The method of claim 8, wherein the memory unit includes further computer code that when executed, causes the at least one processor to adjust the target engine speed based on at least one of vehicle speed trajectory and expected vehicle speed upon completion of the shift from the first one of the simulated gears to the second one of the simulated gears.

12. The method of claim 11, wherein the memory unit includes further computer code that when executed, causes the at least one processor to further adjust the target engine speed based on safety considerations pursuant to accelerator pedal actuation.

13. A method performed by an electronic control unit of a vehicle, the electronic control unit comprising:
   at least one processor; and
   a memory unit operatively coupled to the at least one processor including computer code that when executed, causes the at least one processor to perform the following:
      cause a rotational speed of an internal combustion engine to increase, responsive to a driver of the vehicle using a shift selector to shift from a first one of a plurality of simulated gears to a second one of the plurality of simulated gears based upon respective simulated gear ratios associated with first and second ones of the simulated gears, wherein the second one of the simulated gears is lower than the first one of the simulated gears, wherein the increased rotational speed of the internal combustion engine augment at least one motor generator operatively coupled to the internal combustion engine to provide drive power to a transmission of the vehicle;
      cause a rotational speed of the at least one motor generator to increase to augment drive power provided by the internal combustion engine; and
      cause the at least one processor to transmit a target engine speed to the at least one motor generator.

* * * * *